(12) United States Patent
Schneider et al.

(10) Patent No.: US 11,128,566 B2
(45) Date of Patent: Sep. 21, 2021

(54) METHOD FOR CONTROLLING A NETWORK

(71) Applicant: NEC Laboratories Europe GmbH, Heidelberg (DE)

(72) Inventors: Fabian Schneider, Heidelberg-Bahnstadt (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 16/096,296

(22) PCT Filed: Jun. 30, 2016

(86) PCT No.: PCT/EP2016/065242
§ 371 (c)(1),
(2) Date: Oct. 25, 2018

(87) PCT Pub. No.: WO2017/186316
PCT Pub. Date: Nov. 2, 2017

(65) Prior Publication Data
US 2019/0149465 A1 May 16, 2019

(30) Foreign Application Priority Data

Apr. 27, 2016 (EP) .................................... 16167292

(51) Int. Cl.
*H04L 12/28* (2006.01)
*H04L 12/715* (2013.01)
(Continued)

(52) U.S. Cl.
CPC .............. *H04L 45/64* (2013.01); *H04L 45/48* (2013.01); *H04L 61/103* (2013.01); *H04L 61/6009* (2013.01); *H04L 61/6022* (2013.01)

(58) Field of Classification Search
CPC ............................ H04L 45/64; H04L 61/103
See application file for complete search history.

(56) References Cited

U.S. PATENT DOCUMENTS 9,548,965 B2 * 1/2017 Wang .................. H04L 63/0281
10,142,160 B1 11/2018 Adams et al.
(Continued)

FOREIGN PATENT DOCUMENTS

EP 3091713 A1 11/2016
JP 2014531158 A 11/2014
(Continued)

*Primary Examiner* — Bo Hui A Zhu
(74) *Attorney, Agent, or Firm* — Leydig, Voit & Mayer, Ltd.

(57) ABSTRACT

A method for controlling a network. The network includes a plurality of forwarding elements (FE) connected with each other, one or more end hosts (EH) connected to one or more of the FE, and a controller for controlling the FE. The method includes installing packet processing rules for end-host control protocols (ECP) on the FE. When an ECP Request (ECPRQ) is received by an FE and the ECPRQ was not processed by the controller, the ECPRQ is provided to the controller and an ECP response is computed by the receiving FE based on extracted information from the ECPRQ mapped onto forwarding information based on mapping information if provided, otherwise if the ECPRQ was processed by the controller, the ECPRQ is forwarded according to forwarding information of the ECPRQ. When an ECP response (ECPR) is received by an FE, the ECPR is forwarded according to forwarding information.

19 Claims, 5 Drawing Sheets

(51) Int. Cl.
*H04L 29/12* (2006.01)
*H04L 12/753* (2013.01)

(56) References Cited

U.S. PATENT DOCUMENTS

| | | |
|---|---|---|
| 2013/0250958 A1 | 9/2013 | Watanabe |
| 2015/0071289 A1 | 3/2015 | Shin et al. |
| 2015/0200910 A1 | 7/2015 | Yamada |
| 2016/0330167 A1 | 11/2016 | Cai et al. |
| 2017/0048154 A1* | 2/2017 | Fung ................. H04L 49/25 |
| 2017/0237655 A1* | 8/2017 | Yang ................. H04L 12/4633 370/254 |
| 2017/0295130 A1* | 10/2017 | Mahajan ............... H04L 61/103 |

FOREIGN PATENT DOCUMENTS

| | | |
|---|---|---|
| JP | 2015133556 A | 7/2015 |
| WO | WO 2015109478 A1 | 7/2015 |

\* cited by examiner

METHOD FOR CONTROLLING A NETWORK

CROSS REFERENCE TO RELATED APPLICATIONS

This application is a U.S. National Stage Application under 35 U.S.C. § 371 of International Application No. PCT/EP2016/065242 filed on Jun. 30, 2016, and claims benefit to European Patent Application No. EP 16167292.8 filed on Apr. 27, 2016. The International Application was published in English on Nov. 2, 2017 as WO 2017/186316 A1 under PCT Article 21(2).

FIELD

The present invention relates to a method for controlling a network like a software-defined network, said network comprising a plurality of forwarding elements, 'FE', being connected with each other, one or more end hosts, 'EH', connected to one or more of said FE, and a controller for controlling said FE, wherein packet processing rules for end-host control protocols, 'ECP', like the address resolution protocol, 'ARP', are installed on said FE.

The present invention further relates to a controller for controlling a network like a software-defined network, said network comprising a plurality of forwarding elements, 'FE', being connected with each other, one or more end hosts, 'EH', connected to one or more of said FE, wherein packet processing rules for end-host control protocols, 'ECP', like the address resolution protocol, 'ARP', are installed on said FE.

The present invention further relates to a forwarding element, 'FE', controlled by a controller of a network like a software-defined network, said network comprising said FE and one or more further FE being connected with each other, and one or more end hosts, 'EH', connected to said FE, wherein packet processing rules for end-host control protocols, 'ECP', like the address resolution protocol, 'ARP', are installed on said FE.

The present invention further relates to a network like a software-defined network, said network comprising a plurality of forwarding elements, 'FE', one or more end hosts connected to one or more of said FE on the controller.

The present invention even further relates to a non-transitory computer readable medium storing a program causing a computer to execute a method for controlling a network like a software-defined network, said network comprising a plurality of forwarding elements, 'FE', being connected with each other, one or more end hosts, 'EH', connected to one or more of said FE, and a controller for controlling said FE, wherein packet processing rules for end-host control protocols, 'ECP', like the address resolution protocol, 'ARP', are installed on said FE.

The present invention even further relates to a non-transitory computer readable medium storing a program causing a computer to execute a method for operating a controller for controlling a network like a software-defined network, said network comprising a plurality of forwarding elements, 'FE', being connected with each other, one or more end hosts, 'EH', connected to one or more of said FE, wherein packet processing rules for end-host control protocols, 'ECP', like the address resolution protocol, 'ARP', are installed on said FE.

BACKGROUND

One of the main principles of Software-defined networks—SDN—is to decouple the packet processing and forwarding functions (execution, often called data plane) from the functions that determine what to do to packets and where to forward them (decision, often called control plane). A second main principle is then to centralize the control functions and package them in a so called SDN controller that in turn programs the packet processing and forwarding functions in SDN switches (network elements).

This is a difference to the well-known and still used distributed network control protocols, where control and execution is co-located in network elements and each network element determines what to do to packets and where to forward them.

However one of the problems with SDN today is the lack of support for legacy network components and the integration of the different control methods e.g. centralized vs. distributed. A conventional method to deal with legacy control protocols is to relay them to the SDN controller and let it
(1) inspect the legacy control packets,
(2) update its databases,
(3) calculate required changes, and if required
(4) re-program the SDN switches and finally
(5) respond to the incoming control traffic.

However this is only appropriate for low-volume and inter-network (across network boundaries) legacy control protocols such as Routing (BGP, OSPF, etc.), DNS, Multicast. In contrast thereto end-host and user-device generated control protocols, such as ARP (Address Resolution Protocol, RFC 826), cause a lot of traffic and besides the need to be supported, they cannot be efficiency handled.

In WO 2015/000517 A1 packet templates are shown for programming in-switch response generation to request packets e.g. for legacy control packets. Other conventional handling of ARP packets in software-defined networks is for example disclosed in the non-patent literature of Roberto Bifulco, Julien Boite, Mathieu Bouet, Fabian Schneider. Improving SDN with InSPired Switches, In proceedings ACM Symposium on SDN Research (SOSR), 2016 and in the non-patent literature of Hyunjeong Cho, Saehoon Kang and Younghee Lee, "Centralized ARP proxy server over SDN controller to cut down ARP broadcast in large-scale data center networks," 2015 International Conference on Information Networking (ICOIN), Cambodia, 2015, pp. 301-306. doi: 10.1109/ICOIN.2015.7057900, the latter showing an interworking between a virtual machine instantiation and an SDN controller, wherein ARP is implemented via a proxy in the SDN controller.

SUMMARY

In an embodiment, the present invention provides a method for controlling a network. The network includes a plurality of forwarding elements (FE) connected with each other, one or more end hosts (EH) connected to one or more of the FE, and a controller for controlling the FE. The method includes installing packet processing rules for end-host control protocols (ECP) on the FE. When an ECP Request (ECPRQ) is received by an FE and the ECPRQ was not processed by the controller, the ECPRQ is provided to the controller and an ECP response is computed by the receiving FE based on extracted information from the ECPRQ mapped onto forwarding information based on mapping information if provided, otherwise if the ECPRQ was processed by the controller, the ECPRQ is forwarded according to forwarding information of the ECPRQ. When an ECP response (ECPR) is received by an FE, the ECPR is forwarded according to forwarding information, and if the receiving FE is an edge FE, the ECPR is provided to the controller. An ECP database is maintained and updated by the controller, the ECP database comprising for each EH a network location, protocol network location and network attachment information and at least in part a certain state of the ECP database is installed on some of the FE.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Although applicable in general to any kind of network, the present invention is described herein with regard to Software-defined networks.

Although applicable in general to any kind of end host and/or user-device generated control protocols that perform the mapping e.g. between network addresses at different levels of the network's protocol stack, the present invention is described herein with regard to the address resolution protocol ARP according to RFC 826.

Embodiments of the present invention reduce ARP traffic and reduce interactions between a controller and forwarding elements while retaining flexibility.

In an embodiment, the present invention provides a method for controlling a virtual network like a software-defined network, said virtual network being based on an underlying physical network, said physical network comprising a plurality of forwarding elements, 'FE', being connected with each other, one or more end hosts, 'EH', connected to one or more of said FE, and a controller for controlling said FE, wherein packet processing rules for end-host control protocols, 'ECP', like the address resolution protocol, 'ARP', are installed on said FE, wherein
  a) When an ECP Request, 'ECPRQ', is received by an FE and
    a1) said ECPRQ was not processed by said controller, said ECPRQ is provided to said controller and an ECP response is computed by said receiving FE based on extracted information from said ECPRQ mapped onto forwarding information based on mapping information if provided, otherwise
    a2) if said ECPRQ was processed by said controller, said ECPRQ is forwarded according to forwarding information of said ECPRQ,
  b) When an ECP response, 'ECPR', is received by an FE Said ECPR is forwarded according to forwarding information and if said receiving FE is an edge FE, said ECPR is provided to said controller,
    and wherein
  c) an ECP database is maintained and updated by said controller, said ECP database comprising for each EH its network location, protocol network location and network attachment information and at least in part a certain state of said ECP database is installed on some of said FE.

In a further embodiment, the present invention provides a controller for controlling a virtual network like a software-defined network, said virtual network being based on an underlying physical network, said physical network comprising a plurality of forwarding elements, 'FE', being connected with each other, one or more end hosts, 'EH', connected to one or more of said FE, wherein packet processing rules for end-host control protocols, 'ECP', like the address resolution protocol, 'ARP', are installed on said FE, said controller being adapted to
  A) Receive an ECP Request, 'ECPRQ', from an FE when said ECPRQ was not processed by said controller, to
  B) Receive an ECP response, 'ECPR' from an FE if said receiving FE is an edge FE, to
  C) Maintain and update an ECP database said ECP database comprising for each EH its network location, protocol network location and network attachment information and to
  D) Install at least in part a certain state of said ECP database on some of said FE.

In a further embodiment, the present invention provides a forwarding element, 'FE', controlled by a controller of a virtual network like a software-defined network, said virtual network based on an underlying physical network, said physical network comprising a plurality of forwarding elements, 'FE', being connected with each other, one or more end hosts, 'EH', connected to said FE, wherein packet processing rules for end-host control protocols, 'ECP', like the address resolution protocol, 'ARP', are installed on said FE, wherein said FE being adapted to
  A1) Receive an ECP Request, 'ECPRQ', and when said ECPRQ was not processed by said controller, to provide said ECPRQ to said controller, and to
  B1) Compute an ECP response based on extracted information from said ECPRQ mapped onto forwarding information based on mapping information if provided, otherwise
  C1) if said ECPRQ was processed by said controller, to forward said ECPR according to forwarding information of said ECPRQ, and to
  D1) Receive an ECP response, 'ECPR' and to forward said ECPR according to forwarding information and if said FE is an edge FE, to provide said ECPR to said controller.

In a further embodiment, the present invention provides a virtual network like a software-defined network, said virtual network being based on an underlying physical network, said physical network comprising a plurality of forwarding elements, 'FE' one or more end hosts, 'EH', connected to one or more of said FE, and a controller.

In an even further embodiment, the present invention provides a non-transitory computer readable medium storing a program causing a computer to execute a method for controlling a virtual network like a software-defined network, said virtual network being based on an underlying physical network, said physical network comprising a plurality of forwarding elements, 'FE', being connected with each other, one or more end hosts, 'EH', connected to one or more of said FE, and a controller for controlling said FE, wherein packet processing rules for end-host control protocols, 'ECP', like the address resolution protocol, 'ARP', are installed on said FE, wherein     a) When an ECP Request, 'ECPRQ', is received by an FE and         a1) said ECPRQ was not processed by said controller, said ECPRQ is provided to said controller and an ECP response is computed by said receiving FE based on extracted information from said ECPRQ mapped onto forwarding information based on mapping information if provided, otherwise         a2) if said ECPRQ was processed by said controller, said ECPRQ is forwarded according to forwarding information of said ECPRQ,     b) When an ECP response, 'ECPR' is received by an FE Said ECPR is forwarded according to forwarding information and if said receiving FE is an edge FE, said ECPR is provided to said controller,     and wherein     c) an ECP database is maintained and updated by said controller, said ECP database comprising for each EH its network location, protocol network location and network attachment information and at least in part a certain state of said ECP database is installed on some of said FE.

In an even further embodiment, the present invention provides a non-transitory computer readable medium storing a program causing a computer to execute a method for operating a controller for controlling a virtual network like a software-defined network, said virtual network being based on an underlying physical network, said physical network comprising a plurality of forwarding elements, 'FE', being connected with each other, one or more end hosts, 'EH', connected to one or more of said FE, wherein packet processing rules for end-host control protocols, 'ECP', like the address resolution protocol, 'ARP', are installed on said FE, said method comprising     A1) Receiving an ECP Request, 'ECPRQ', from an FE when said ECPRQ was not processed by said controller,     B1) Receiving an ECP response, 'ECPR' from an FE if said receiving FE is an edge FE,     C1) Maintaining and updating an ECP table said ECP table comprising for each EH its network location, protocol network location and network attachment information and     D1) Installing at least in part a certain state of said ECP table on some of said FE.

The terms "forwarding element", "end host", "controller", etc. refer in particular in the claims, preferably in the specification each to a device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software-based and/or hardware-based installed in the memory on which the processor(s) can work on. The computing devices may be adapted in such a way that the corresponding steps to be computed are performed in an optimized way. For instance different steps may be performed in parallel with a single processor on different of its cores. Further the devices may be identical forming a single computing device. The devices or devices may also be instantiated as a virtual device running on a physical computing resource. Different devices may therefore be executed on said physical computing resource.

The term "forwarding element" further refers in particular in the claims, preferably in the specification to a device adapted to perform forwarding of information, data etc. in the network, like a switch or a router or the like: Said device may have dedicated hardware support for forwarding and/or processing of packets in networks like computer networks.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The term "rule" is to be understood in its broadest sense and refers in particular in the claims, preferably in the specification to one or more conditions to which one or more actions are assigned or linked, wherein said actions being executed or performed when said conditions are matched. For instance when pre-defined parameters like a type of the packet and size of the packet forming a condition are matched, then an action like forwarding said packet to a certain end host are performed, The terms "forwarding information" and "network location" are each to be understood in its broadest sense and refers in particular in the claims, preferably in the specification to a physical address, e.g. a hardware address like a MAC address or the like.

The term "edge forwarding element" or "edge FE" is to be understood in its broadest sense and refers in particular in the claims, preferably in the specification to a forwarding element which is directly connected to at least one end host EH said EH may run a legacy IP/TCP stacks and which may also generate ECP requests.

The term "topology" refers in particular in the claims, preferably in the specification to information about at least part of all network connections, the network comprising forwarding elements and end hosts being connected with each other.

The term "protocol network location" is to be understood in its broadest sense and refers in particular in the claims, preferably in the specification to protocol network addresses like IP addresses.

The term "network attachment point" is to be understood in its broadest sense and refers in particular in the claims, preferably in the specification to information about a data path, like data identification specifying one or more interfaces of the forwarding element.

The term "state" with regard to the ECP database is to be understood in its broadest sense and refers in particular in the claims, preferably in the specification to a relation, relationship, mapping or the like between hardware location information and protocol location information like hardware addresses or protocol addresses, e. g. a MAC-IP mapping.

The term "tree" refers in particular in the claims, preferably in the specification to at least two network devices being connected to each other and organized in a tree-like structure and being brought into an ordering. In particular the term "tree" with regard to "forwarding" refers to information which are forwarded according to the forwarding trees, said forwarding trees comprising of different forwarding elements for forwarding the data along the forwarding elements of the tree to end hosts.

The term "exception" with regard to the term "situation" is to be understood in its broadest sense and refers in particular in the claims, preferably in the specification to any kind of situation, scenario, state, etc. within the virtual or physical network which is e.g. defined by one or more thresholds for certain parameters, said thresholds being exceeded or fallen below.

At least one embodiment may have at least one of the following advantages:

fewer interactions between forwarding elements and the controller thereby reducing load on the corresponding control channel and the controller; this applies in particular when compared with a conventional ECP request like an ARP request being broadcast through the network fewer ECP traffic like ARP traffic in the controlled network; this applies in particular when compared to a ARP proxy in or used with the controller retained flexibility of the virtual network control to change the processing and forwarding at any time; this means for example that the controller decides which network element replies to the ECP requests like ARP requests which is being selected or chosen at closest to the source of the request as possible.

Further features, advantages and further embodiments are described or may become apparent in the following:

Said ECP may be the ARP.

A topology of the network may be detected and forwarding information may be computed and provided in form of forwarding trees. This enables in a very effective way to prepare the virtual network and the underlying physical network for operation.

To decide if an ECPRQ was processed by said controller it may be checked whether the extracted information corresponds to broadcast information like a broadcast address or the like. This enables an easy way to differentiate whether a request has been processed by the controller before or not. In case the extracted information corresponds to broadcast information then this request is defined to be not processed by the controller.

One or more states in the ECP database may be removed after certain periods of time. This allows during operation to keep the ECP database "clean" by removing entries which are not used anymore. Thus resources for said database can be saved.

A state of said ECP database may be only installed on some of said edge FE. This enables in an optimized way to use computing resources within edge switches for example since a memory in a FE is usually very limited and for example in large networks it might be not desirable to replicate all IP-to-MAC mappings at each individual edge switch.

Said state of said ECP database for an EH may be only installed on edge FE at which an ECPRQ for said EH has been received. This allows to further enhance the efficiency since only rules and states are installed on edge switches receiving specific ECPRQ that match to the corresponding installed state.

Installing information of states installed on FE may be stored in the ECP database. This enhances further the operation and the installation of rules by the controller since the controller knows the states on corresponding FEs.

In case of an exception situation of said network, a higher priority rule in one or more of said FE may be installed omitting transmitting an ECPRQ and/or ECPR to said controller. This enables for example in case of an overload situation as an exception situation to avoid sending of ECPRQ and ECPR to the controller. Thus overload within the network is reduced.

Said higher priority rule may be provided with a hard timeout. This ensures that such a higher priority rule is without exception—"hard"—limited to a certain amount of time since for example such a higher priority rule prevents the controller from learning mappings and thus the controller is temporary not able to recognize the current situation with regard to installed states, etc. in the network.

States to be installed on FE may be pushed to said FE. This ensures that the controller can install at every time and continuously states on the FE without having to wait until switches request.

Figure 1:
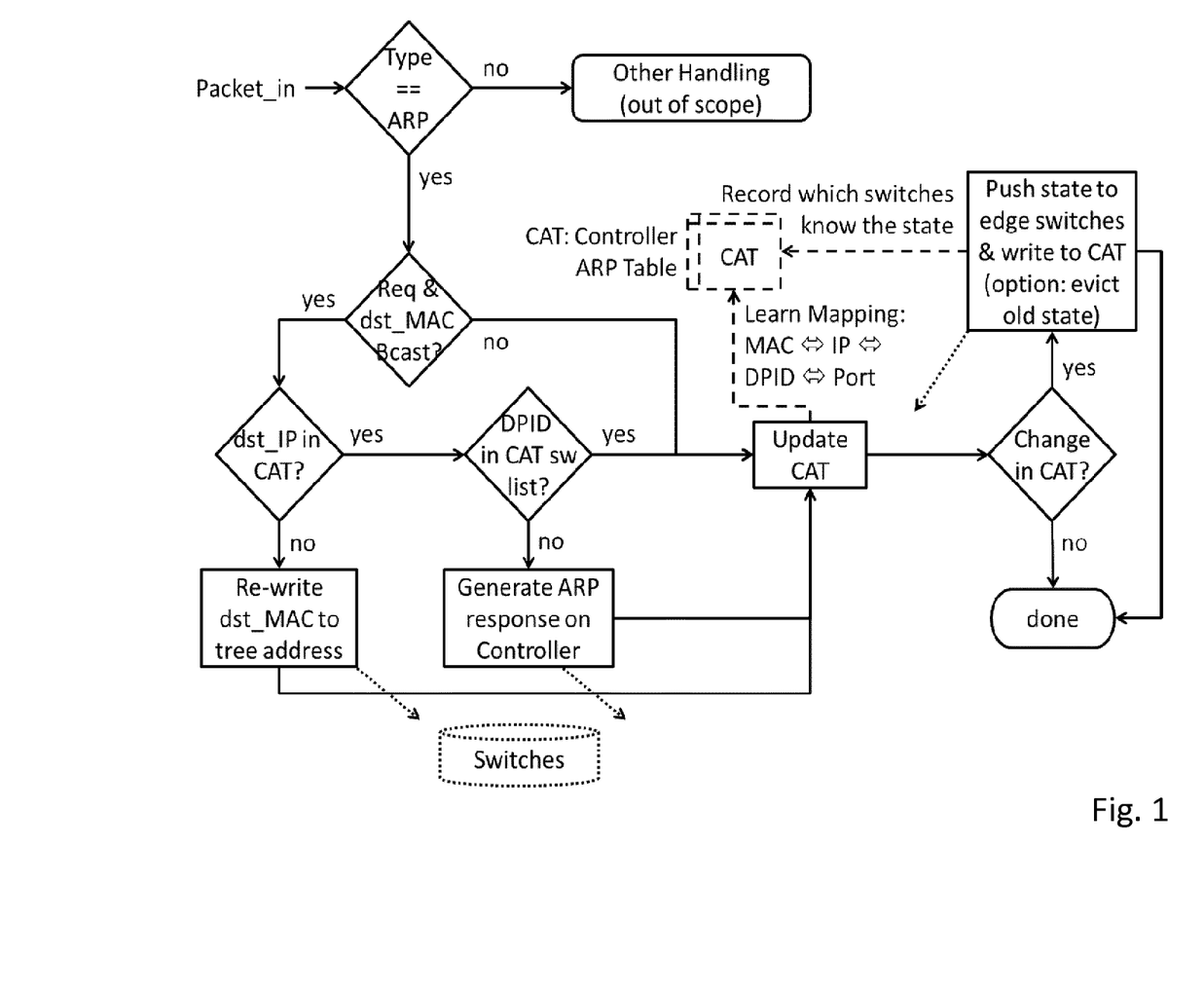
FIG. 1 shows part of a method according to an embodiment of the present invention.

FIG. 1 shows part of a method according to an embodiment of the present invention.

In FIG. 1 a method for operating a controller of the virtual network is shown. Prior to perform the method for the controller according to FIG. 1 a preparation method or phase is performed:

In the preparation phase default ARP packet processing rules will be installed in the SDN switches, like shown in table 1 below with rules #1-#4 the topology is detected, forwarding trees are calculated and corresponding forwarding entries will be installed in the switches flow tables, wherein a forwarding tree can be calculated e.g. using mechanisms such as spanning tree algorithms or multicast tree calculation and MAC addresses may be reserved to identify such forwarding trees. In a simple star topology network forwarding to such tree would e.g. correspond to broadcasting. In this case an additional MAC address for the broadcast tree beyond the default may be required. In more complex topologies one already uses multiple spanning trees, multicast trees or esp. in data centers virtual networks each with its own broadcast like forwarding tree. For some rules edge switches and other switches are differentiated. Edge switches are characterized in that they are directly connected to end-hosts that run legacy IP/TCP network stacks and therefore also generate ARP requests.

TABLE 1

| # | Match | Action |
|---|---|---|
| 1 | ARP_op==Request + ARP_MAC_dst==BCast | To_Controller + ARP_PacketTemplate* *If no template is available, skip this Action |
| 2 | ARP_op==Request + ARP_MAC_dst==Tree | Output (according to forwarding tree) |
| 3 | ARP_op==Reply @ Edge Switch | To_Controller + Output (according to forwarding tree) |
| 4 | ARP_op==Reply @ other Switch | Output (according to forwarding tree) |

ARP_op refers to the ARP operation (either request or reply); ARP_MAC_dst refers to the ARP target hardware address; To_Controller means to send the received packet to the controller (in OpenFlow this is for example possible using the packet_in instruction); Output (according to forwarding tree) means to forward the packet along the typical L2 forwarding rules for the selected forwarding tree.

The in-switch packet generation is invoked with the ARP_PacketTemplate action e. g. shown in EP 16 167 292.8. Each edge switch holds a state table in which the SDN controller can install MAC address to IP address mappings. If the ARP_PacketTemplate action is triggered the following processing occurs:

1. The destination IP address is extracted from the received ARP request packet
2. This IP is looked up in the MAC⇔IP state table.
3. If an entry exists an ARP response packet is generated by
   a. Loading the template ARP response packet stored as part of the ARP_PacketTemplate
   b. Copying the source/sender MAC and IP address to the destination/target MAC and IP address fields of the template
   c. Copying the previously extracted destination IP address and the corresponding MAC address from the MAC⇔IP state table to the source/sender MAC and IP address fields of the template
   d. Calculate the Ethernet checksum for the generated packet
   e. Sending this packet out according to regular L2 forwarding.
4. If no entry exists, no further action is performed. Optionally in this case the switch could notify the controller of a lack of entry.

Here ARP requests that have been processed by the SDN controller and those that have not are differentiated. This is reflected by the first two rules #1, #2. If the ARP_MAC_dst is the broadcast address, then it is defined this request has not been processed by the controller. Accordingly the request is sent to the controller. If the ARP_MAC_dst is another address e.g. an identifier for a multicast tree it is assumed the packet was processed by the controller already, and will not sent it over again.

In a next step the operation of the controller is performed together with a optimization if needed:

In the operation phase the controller method will run in a loop together with the optional optimization. The controller algorithm or method maintains a controller ARP Table (CAT) which serves as a network-wide MAC learning table and records mappings between Hardware Addresses (e.g. Ethernet MAC address), Protocol Addresses (e.g. IP Addresses), and the corresponding network attachment point. The controller method also installs part of this collected state into the switches so that the locally executed in-switch packet generation function can create ARP response packets close to the ARP requestor.

In the optimization phase, special forwarding rules can be installed in order to further reduce the load of packets sent to the controller and CAT state can be selectively shared with only subsets of all the switches.

Embodiments of invention are primarily targeted towards data center networks however they are applicable to all virtual networks like SDN networks that allow in-switch packet generation.

In the operation phase the SDN controller maintains the Controller-ARP table CAT and runs the method depicted in FIG. 1. An example of the CAT is given below:

TABLE 2

EXAMPLE CONTROLLER-ARP TABLE (CAT)

| MAC | IP | DPID | PortNr | Switches w/ State | Comment |
|---|---|---|---|---|---|
| 00:00:00:00:00:01 | 192.168.0.1 | 0001 | #1 | | Entry No. 1 |
| 01:02:03:04:05:06 | 192.168.0.2 | 0002 | #1 | 0001 | Entry No. 2 |
| 01:23:45:67:89:AB | 10.11.12.13 | 0003 | #52 | 0001, 0002, 0003 | Entry No. 2 |

In this network-wide ARP table the controller maintains it knowledge about all end hosts EH attached to the network. For each end host EH it stores the MAC address of the end host, the IP address of the end-host and the network attachment point in form of the DPID (data path ID, specifies the switch) and port number in the switch with that DPID. In addition the switches are recorded to which this state (MAC⇔IP mapping) was transferred.

The content of the CAT table and instructions to the switches are governed by the steps as shown in FIG. 1.

When an ARP packet is sent to the Controller (according to the To_Controller action from the default rules), the method goes through a two step process. Both steps could be performed independently or subsequently. The first step (shown on the left FIG. 1 before entering the "Update CAT" process) is responsible for ensuring that an ARP response is produced. The second step (on the right in FIG. 1 starting with the "Update CAT" process) is responsible for learning the mappings and distributing this knowledge to the switches.

The first step is looking at the destination/target addresses of the packet. It begins with checking if the ARP Request is observed for the first time in the network, this is true when the dst_MAC address is the broadcast address. If this is not the case, as well as if the packet is an ARP reply, the second step is performed. If the dst_MAC address is the broadcast address there are two options, either the corresponding mapping (i.e. the dst_IP is in the CAT) was learned or not. If it was not learned yet, the packet is broadcasted along the forwarding tree and therefore replaces the dst_MAC address with the forwarding tree address. If it was learned already it is checked if this learned state has been installed at the receiving switch (i.e. is the DPID of the receiving switch in the switch list of the CAT). If so the receiving switch has already generated the ARP response according to the default rules and then CAT update is performed. If not, the response is generated on the controller (this case should be the exception, which can be handled in the optimization phase).

In the second step the controller updates the CAT with the source/sender information from the packet. If the learned this update may be limited to a timer reset of the corresponding entry in the CAT. If however in case of a change in the CAT, e.g. new entry or change of an entry resulted from the update, the controller needs to push this state to the edge switches, and to maintain the list of switches to which the corresponding MAC⇔IP mapping has been pushed. Optionally the old state may be evicted from the CAT in this step.

In a deployment scenario of data centers where virtual machines, 'VM', are instantiated by a cloud management system which likely knowns details such as the IP & MAC address and location of the instantiated VM, such information can be exchanged with the SDN controller to pre-fill the CAT. This is optional.

Gracious ARP replies, i.e. ARP replies that are sent deliberately without a corresponding ARP request in order to update ARP mapping tables, are properly handled by embodiments of the present invention. According to the rules all ARP replies on edge switches are forwarded to the controller. There the source host mapping is learned for ARP replies.

In the following FIGS. 2-5 an example of the operation of the controller according to the steps of FIG. 1 is shown.

Figure 2:
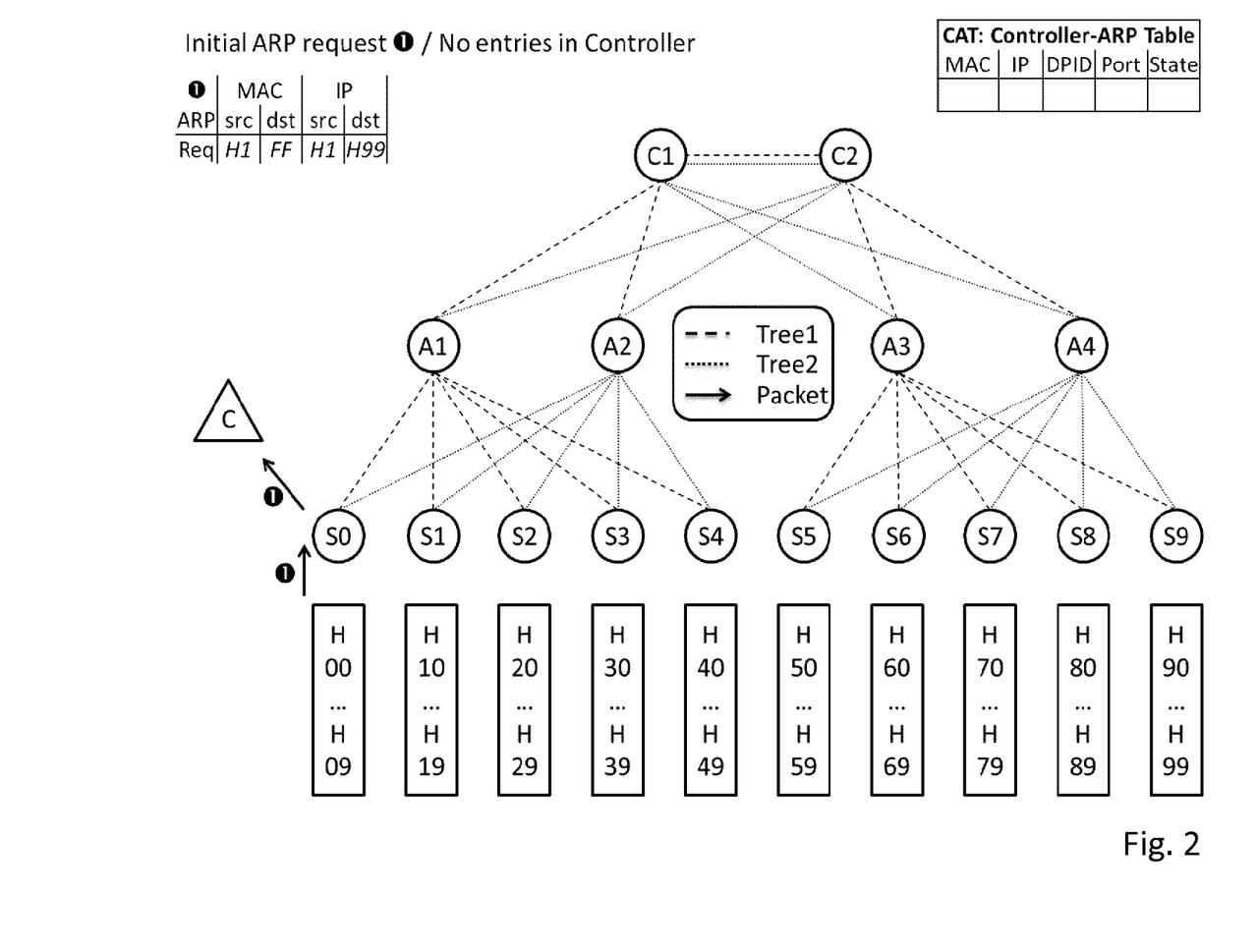
FIG. 2 shows part of a method according to a further embodiment of the present invention.

FIG. 2 shows part of a method according to a further embodiment of the present invention.

In FIG. 2 an initial ARP request and no entries at the controller are shown.

In the beginning the CAT is assumed to the empty, because no ARP packet has been processed. As shown in FIG. 2 an ARP request is received by and at switch S0 and the packet is sent to the controller (rule #1). As no state is installed, no ARP reply is generated at the switch.

Figure 3:
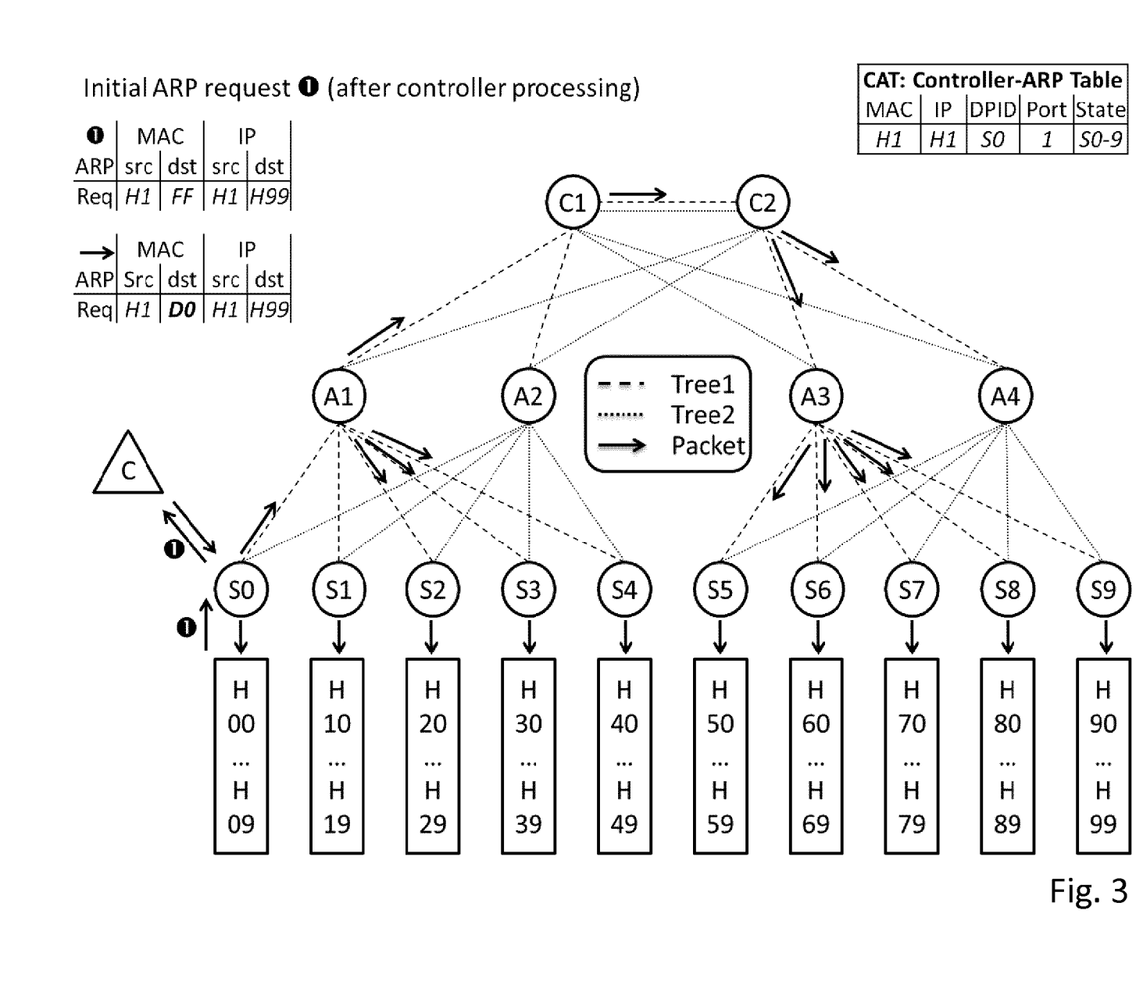
FIG. 3 shows part of a method according to a further embodiment of the present invention.

FIG. 3 shows part of a method according to a further embodiment of the present invention.

In FIG. 3 controller processing ARP request forwarding for an initial ARP request is shown.

FIG. 3 shows that according to the controller the dst_IP (in this case H99) has not been learned yet, the dst_MAC is re-written to the address of Tree1 (D0) and the packet is distributed along the specified forwarding tree. Concurrently, the mapping for H1 is learned and stored in the CAT (see top right). H99 will eventually receive the ARP request for itself. According to the default rules only S0 will send the packet to the controller, while all other switches forward the packet along the forwarding tree because the dst_MAC has been re-written to the tree address D0 (rule #2).

Figure 4:
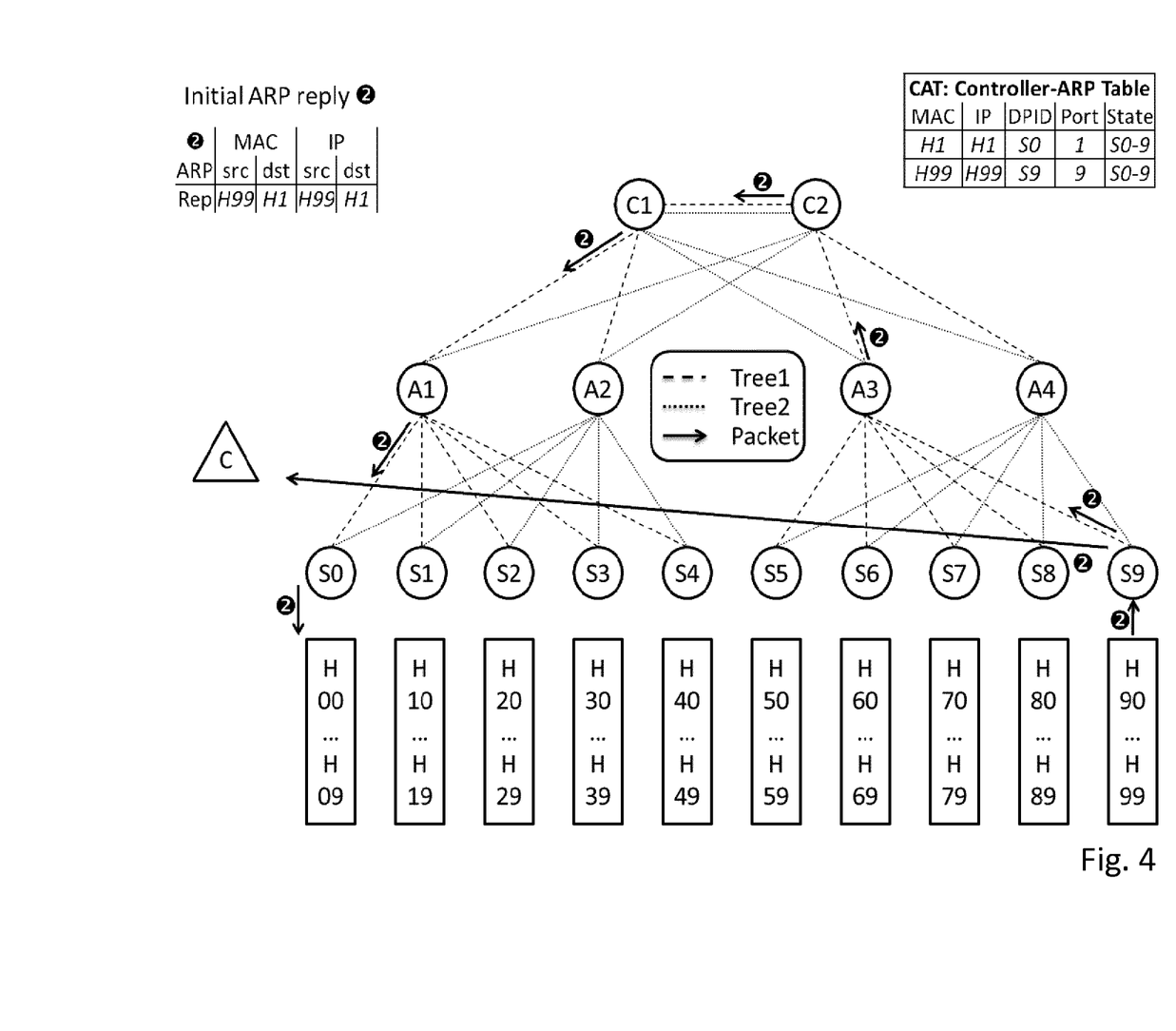
FIG. 4 shows part of a method according to a further embodiment of the present invention and FIG. 5 shows part of a method according to a further embodiment of the present invention.

FIG. 4 shows part of a method according to a further embodiment of the present invention.

In FIG. 4 an ARP reply to an initial ARP request is shown.

FIG. 4 shows the distribution of the resulting ARP reply. Upon reception of the ARP reply switch S9 sends a copy to the controller (rule #3), so that the mapping for H99 can be learned. As the packet is an ARP reply, only the second step of the controller operating method is processed. Simultaneously, the ARP reply is forwarded along the unicast path to H1, where it enables standard TCP/IP connections between H1 and H99.

Figure 5:
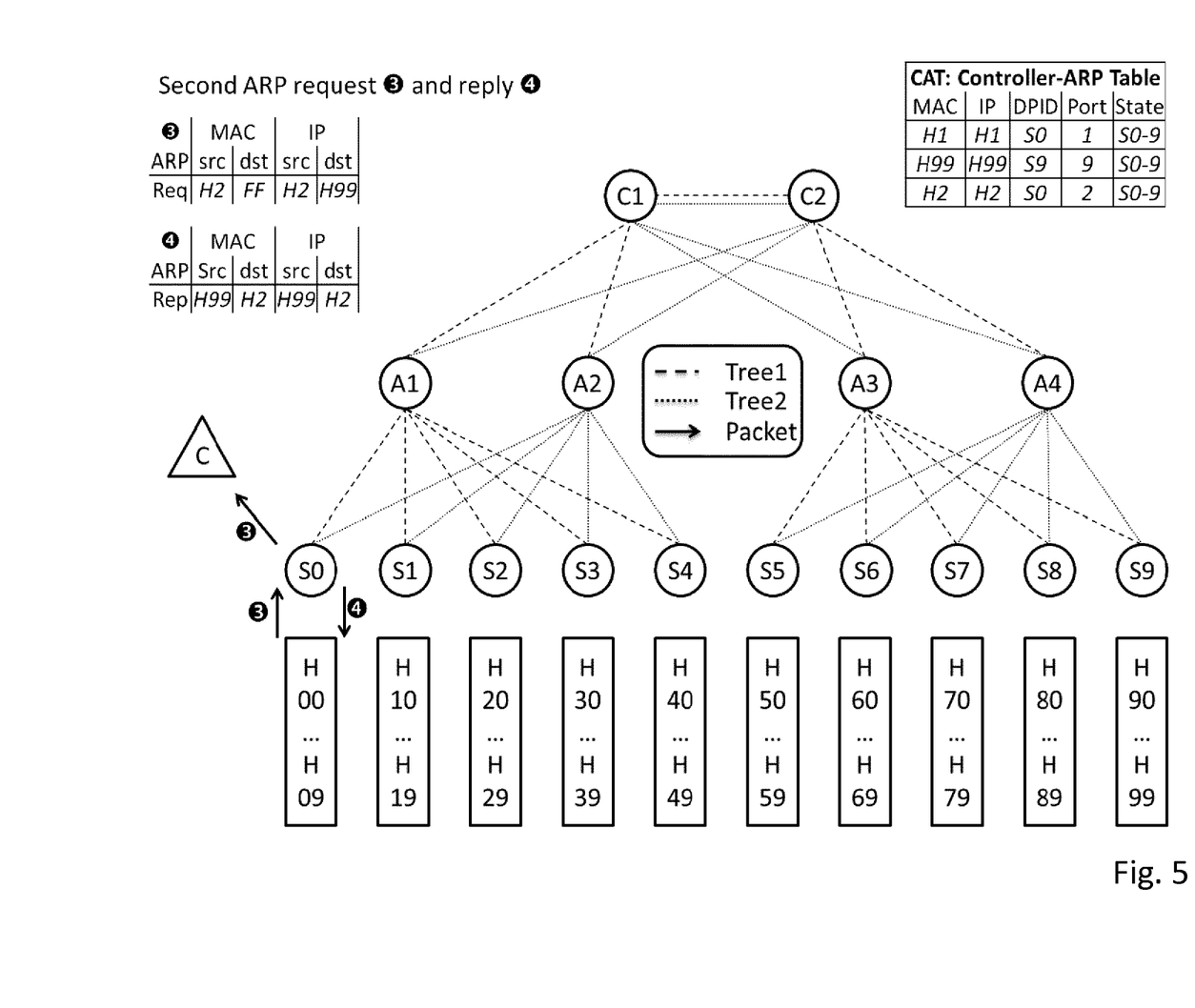

Here the mapping state is distributed to all edge switches, as is shown in the rightmost column in the CATs in the top right corner. This means that after these two ARP packets (the request and the reply) all edge switches (S0-S9) will directly generate the ARP replies for H1 and H99, which is shown in FIG. 5.

To optimize the aforementioned method an optional optimization phase can be performed. Possible optimizations are as follows:

Switch limitations: Often memory at switches is limited, therefore in large networks it might not be desirable to replicate the all IP to MAC mappings at each individual edge switch, esp. when for example all hosts in a specific virtual network are attached at only two switches (i.e. assume a virtual network of hosts H3,H5, H6,H7,H80, H81,H82 in the topology shown in FIG. 5) it would be useless to store the mappings for these hosts at other switches (i.e. only store them at S0 and S8). Another example could be a more generic method or procedure that only installs mapping state for a host on edge switches at which an ARP request for that host arrived, or one that evicts state at switches after a certain period of not having received ARP requests for that state. In order to enable such optimization the controller may keep track of where it installed the mapping state and needs the fallback to generate ARP replies itself. If such a fallback was triggered it may be advisable to install the corresponding mapping again.

Controller limitations: SDN controllers need to process large numbers of packet_in's. Basically a copy of each ARP message received at an edge switch is sent to the controller, in order to update the CAT. In a steady state network this task degrades to a maintenance task, which however still generated a lot of processing load at the controller and the controller to switch communication channel. In order to address such potential overload situations the controller could temporarily choose to specific higher priority rules like the one in Table 3, which omit the packet_in to the controller.

TABLE 3

| SPECIAL RULES (HIGHER PRIORITY) | | |
|---|---|---|
| # | Match | Action |
| 5 | ARP_op==Request + ARP_MAC_dst==BCast + dst_IP==X | ARP_PacketTemplate* |

In case the controller chooses to use this option stale state should be avoided. This rule basically prevents the controller from learning CAT mappings, i.e. both new mappings and updates to existing mappings. This could be addressed by deploying hard timeouts for such entries. Anyway outdated entries may cause other failure notifications, such as ICMP destination unreachable.

A further embodiment of the present invention provides a method for SDNized APR handling with in-switch packet generation Comprising the steps of
1) Configuring default SDN rules for ARP processing, using programmable in-switch packet generation mechanisms (as defined in Table 1)
2) Running a ARP processing control algorithm in the SDN controller during network operations (as shown in FIG. 1)

In summary, one or more embodiments of the present invention enable or provide in particular one or more of the following:
1) Design of an ARP handling method that leverages the concepts of SDN in general and in-switch packet generation (see earlier patent application) in particular. More specifically by
   a. Using an additional L2 address for "broadcasting" ARP requests for unknown destination L3 addresses in order to avoid always notifying the SDN controller while forwarding on the Bcast tree
   b. Synchronizing the state learned at the controller with selected the edge switches, that can then use PacketTemplates to generate reply on switch rather than on controller.
   c. Push state to selected switches, and store which switch has PacketTemplates installed
2) Combination of packet processing rules and controller algorithm to replace legacy end-host based ARP processing with network assisted ARP processing, to reduce network load.
3) Optional optimization approach to address switch memory limitations and controller and control channel load.

Embodiments of the present invention may have in particular inter alia one or more of the following advantages:

Fewer ARP traffic in the controlled network. Esp. when compare to a basic all ARP requests are broadcast through the network case Fewer interactions between the SDN switch and the SDN controller (thereby reducing load on the SDN control channel and the SDN controller). Esp. when compared to a ARP proxy in the Controller deployment.

While retaining the flexibility of SDN control to change the processing and forwarding at any time. I.e. the controller decides which network element replies to the ARP requests, ideally choosing the closest to the source.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for end-host control protocol (ECP) request (ECPRQ) processing in a software-defined network (SDN), the SDN including a plurality of forwarding elements (FE) being connected with each other and further being connected with a plurality of end hosts (EH), the SDN further including an SDN controller for controlling the plurality of FE, the method comprising:
    storing, at each respective FE of the plurality of FE, respective packet processing rules for end-host control protocols (ECP) and a respective address mapping table provided by the SDN controller, wherein each respective address mapping table is a subset of a network-wide address mapping table maintained by the SDN controller, each respective address mapping table including, for each EH of a respective subset of the plurality of EH, a state that maps protocol location information to hardware location information;
    receiving, by a recipient FE of the plurality of FE from a sender EH of the plurality of EH, an ECPRQ;
    processing, by the recipient FE, the received ECPRQ according to respective packet processing rules and a respective address mapping table installed on the recipient FE;
    performing an optimization phase, the optimization phase including:
        evicting, from a respective address mapping table stored at a respective FE, a stale state, wherein the stale state is a state for which the respective FE has not received an ECPRQ during a timeout period,
    wherein the processing, by the recipient FE, the received ECPRQ according to the respective packet processing rules installed on the recipient FE by the SDN controller comprises:
        extracting, by the recipient FE, a destination IP address from the received ECPRQ, determining, by the recipient FE, that the destination IP address extracted from the received ECPRQ matches an IP address in the respective address mapping table provided to the recipient FE by the SDN controller, computing, by the recipient FE, an ECP response (ECPR), and transmitting, by the recipient FE, the ECP response to the sender EH.

2. The method according to claim 1, further comprising detecting, by the SDN controller, a topology of the network and computing forwarding information in a form of forwarding trees.

3. The method according to claim 1, wherein in case of an exception situation of the network, a higher priority rule in one or more of the FE is installed omitting transmitting an ECPRQ and/or ECPR to the controller.

4. The method according to claim 3, wherein the higher priority rule is provided with a hard timeout.

5. The method according to claim 1, wherein states to be installed on a respective FE are pushed to the respective FE.

6. The method according to claim 1, wherein the packet processing rules for ECP installed on each respective FE include instructions to:
    extract, when a respective ECPRQ is received by the respective FE, destination information,
    determine whether the extracted destination information indicates that forwarding information for the respective ECPRQ is known by the SDN controller, and
    if the extracted destination information indicates that the forwarding information for the respective ECPRQ is known by the SDN controller, forward the respective ECPRQ according to the forwarding information for the respective ECPRQ, or if the extracted destination information indicates that the forwarding information for the respective ECPRQ is not known by the SDN controller:
        extract, from the respective ECPRQ, a destination IP address and compute an ECP response when the extracted destination IP address matches an IP address in the respective address mapping table provided to the respective FE by the SDN controller, and
        provide the respective ECPRQ to the SDN controller.

7. The method according to claim 6, wherein determining whether the extracted destination information indicates that the forwarding information for the respective ECPRQ is known by the SDN controller comprises determining whether the extracted destination information corresponds to a broadcast address.

8. The method according to claim 1, further comprising maintaining, by the SDN controller, an ECP database that includes, for each of the plurality of EH, a state that maps protocol location information to hardware location information and network attachment information.

9. The method according to claim 8, wherein one or more states in the ECP database are removed after certain periods of time.

10. The method according to claim 8, wherein a state of the ECP database is installed on only some edge FE of the plurality of FE.

11. The method according to claim 10, wherein the state of the ECP database for an EH is only installed on edge FE at which an ECPRQ for the EH has been received.

12. The method according to claim 8, wherein installing information of states installed on FE is stored in the ECP database.

13. The method according to claim 8, wherein each respective subset of the plurality of EH, for which each respective address mapping table includes a state, consists of less than all of the plurality of EH.

14. The method according to claim 1, wherein the performing the optimization phase further includes installing special forwarding rules to reduce the load of packets sent to the SDN controller, the special forwarding rules including not forwarding the received ECPRQ to the SDN controller and not generating an ECP response when no state corresponding to the destination IP address from the received ECPRQ is included in the respective address mapping table installed on the recipient FE.

15. The method according to claim 1, wherein the stale state is a state that maps stale protocol location information to hardware location information, the stale protocol location information being protocol location information not included in either a source field or a destination field of any ECPRQ received by the respective FE during the timeout period.

16. A software-defined network (SDN) controller for controlling an SDN network, the SDN network including a plurality of forwarding elements (FE) being connected with each other and further being connected with a plurality of end hosts (EH), the SDN controller comprising:
one or more processors configured to:
provide, to each respective FE of the plurality of FE, respective packet processing rules for end-host control protocols (ECP) and a respective address mapping table, wherein each respective address mapping table is a subset of a network-wide address mapping table maintained by the SDN controller, each respective address mapping table including, for each EH of a respective subset of the plurality of EH, a state that maps protocol location information to hardware location information, and
perform an optimization phase, the optimization phase including evicting, from a respective address mapping table stored at a respective FE, a stale state, wherein the stale state is a state for which the respective FE has not received an ECPRQ during a timeout period,
wherein the respective packet processing rules include rules specifying processing of an ECP request (ECPRQ) received from a sender EH of the plurality of EH, the rules including instructions to:
extract, by the recipient FE, a destination IP address from the received ECPRQ, determine, by the recipient FE, that the destination IP address extracted from the received ECPRQ matches an IP address in the respective address mapping table provided to the recipient FE by the SDN controller, compute, by the recipient FE, an ECP response (ECPR), and transmit, by the recipient FE, the ECP response to the sender EH.

17. A first forwarding element (FE) controlled by a software-defined network (SDN) controller of an SDN network, the SDN network including a plurality of forwarding elements being connected with each other and further being connected with a plurality of end hosts (EH), the first FE comprising:
one or more processors configured to:
receive, from the SDN controller, packet processing rules for end-host control protocols (ECP) and a respective address mapping table, the respective address mapping table being a subset of a network-wide address mapping table maintained by the SDN controller, the respective address mapping table including, for each EH of a respective subset of the plurality of EH, a state that maps protocol location information to hardware location information,
evict, from the respective address mapping table, a stale state, wherein the stale state is a state for which the first FE has not received an ECPRQ during a timeout period,
receive, from a sender EH of the plurality of EN, an ECP request (ECPRQ), and
process the received ECPRQ according to the packet processing rules, wherein processing the received ECPRQ according to the packet processing rules comprises:
extracting, by the recipient FE, a destination IP address from the received ECPRQ, determining, by the recipient FE, that the destination IP address extracted from the received ECPRQ matches an IP address in the respective address mapping table provided to the recipient FE by the SDN controller, computing, by the recipient FE, an ECP response (ECPR), and transmitting, by the recipient FE, the ECP response to the sender EH.

18. A software-defined network (SDN) comprising:
an SDN controller; and
a plurality of forwarding elements (FE), the plurality of forwarding elements being connected with each other and further being connected with a plurality of end hosts (EH),
wherein the SDN controller is configured to:
provide, to each respective FE of the plurality of FE, respective packet processing rules for end-host control protocols (ECP) and a respective address mapping table, wherein each respective address mapping table is a subset of a network-wide address mapping table maintained by the SDN controller, each respective address mapping table including, for each EH of a respective subset of the plurality of EH, a state that maps protocol location information to hardware location information, and
perform an optimization phase, the optimization phase including evicting, from a respective address mapping table stored at a respective FE, a stale state, wherein the stale state is a state for which the respective FE has not received an ECPRQ during a timeout period,
wherein the respective packet processing rules include rules specifying processing of an ECP request (ECPRQ) received from a sender EH of the plurality of EH, the rules including instructions to:
extract, by the recipient FE, a destination IP address from the received ECPRQ, determine, by the recipient FE, that the destination IP address extracted from the received ECPRQ matches an IP address in the respective address mapping table provided to the recipient FE by the SDN controller, compute, by the recipient FE, an ECP response (ECPR), and transmit, by the recipient FE, the ECP response to the sender EH.

19. A non-transitory computer readable medium storing a program configured to, when executed, cause a computer to execute a method for end-host control protocol (ECP) request (ECPRQ) processing in a software-defined network (SDN), the SDN including a plurality of forwarding elements (FE) being connected with each other and further being connected with a plurality of end hosts (EH), the SDN further including an SDN controller for controlling the plurality of FE, the method comprising:
storing, at each respective FE of the plurality of FE, respective packet processing rules for end-host control protocols (ECP) and a respective address mapping table provided by the SDN controller, wherein each respective address mapping table is a subset of a network-wide address mapping table maintained by the SDN controller, each respective address mapping table including, for each EH of a respective subset of the plurality of EH, a state that maps protocol location information to hardware location information;

receiving, by a recipient FE of the plurality of FE from a sender EH of the plurality of EH, an ECPRQ; and processing, by the recipient FE, the received ECPRQ according to respective packet processing rules and a respective address mapping table installed on the recipient FE; and performing an optimization phase, the optimization phase including evicting, from a respective address mapping table stored at a respective FE, a stale state, wherein the stale state is a state for which the respective FE has not received an ECPRQ during a timeout period, wherein the processing, by the recipient FE, the received ECPRQ according to the respective packet processing rules installed on the recipient FE by the SDN controller comprises:

extracting, by the recipient FE, a destination IP address from the received ECPRQ, determining, by the recipient FE, that the destination IP address extracted from the received ECPRQ matches an IP address in the respective address mapping table provided to the recipient FE by the SDN controller, computing, by the recipient FE, an ECP response (ECPR), and transmitting, by the recipient FE, the ECP response to the sender EH.

* * * * *